C. A. Gregory,

Fruit Jar.

No. 93,820.                    Patented Aug. 17, 1869.

Witnesses:

Inventor:
Charles A. Gregory
per
John E. Earl
Attorney.

UNITED STATES PATENT OFFICE.

CHARLES A. GREGORY, OF STRATFORD, CONNECTICUT, ASSIGNOR TO HIMSELF AND ALLEN GREGORY, OF SAME PLACE.

IMPROVEMENT IN FRUIT-JARS.

Specification forming part of Letters Patent No. 93,820, dated August 17, 1869.

*To all whom it may concern:*

Be it known that I, CHARLES A. GREGORY, of Stratford, in the county of Fairfield and State of Connecticut, have invented a new Improvement in Fruit-Jars; and I do hereby declare the following, when taken in connection with the accompanying drawings, and the letters of reference marked thereon, to be a full, clear, and exact description of the same, and which said drawings constitute part of this specification, and represent, in—

Figure 1:
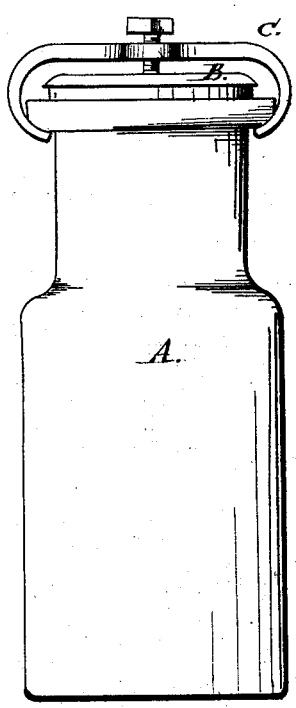
Figure 2:
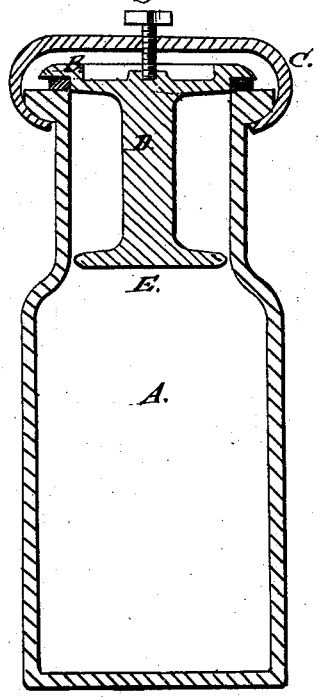

Figure 1 a side view, and in Fig. 2 a vertical central section.

This invention relates to an improvement in fruit-jars, the object being to combine with the stopper or cover an auxiliary head, which, while it partially closes the neck, passes so far down into the neck as to press the fruit below the sirup, and thus insure its being covered.

To enable others skilled in the art to make and use my invention, I will proceed to describe the same, as illustrated in the accompanying drawings.

A is a fruit-jar of common construction; B, the cover or head proper fitted to the neck of the jar, and secured therein by means of the yoke C, or other known device. To the head B, I attach a spindle or stud, D, extending down into the neck of the jar, and there formed into an auxiliary head, E, as seen in Fig. 2, the said auxiliary head being of less diameter than the neck of the jar.

The fruit is placed in the jar in the usual manner, and the cover placed thereon. The auxiliary head E, passing down into the sirup, (or whatever it may be the fruit is preserved in,) prevents the fruit from rising to the top or above the sirup, the jar being filled with sirup above the auxiliary head E. Thus it will be seen that in whatever position the jar is placed the fruit therein will be held down in the jar. Especially is this desirable in pickles and other articles preserved in vinegar.

What I claim as my invention, and desire to secure by Letters Patent, is—

The combination of the auxiliary head E with the principal head or cover B, united together so as to be held in position, substantially in the manner herein set forth.

CHARLES A. GREGORY.

Witnesses:
H. T. BLAKE,
DAVID B. LOCKWOOD.